(12) United States Patent
Thomas et al.

(10) Patent No.: US 10,992,591 B1
(45) Date of Patent: Apr. 27, 2021

(54) APPARATUS, SYSTEM, AND METHOD FOR DISCOVERING PATH MAXIMUM TRANSMISSION UNITS

(71) Applicant: Juniper Networks, Inc., Sunnyvale, CA (US)

(72) Inventors: Reji Thomas, Bangalore (IN); Ronald Bonica, Sterling, VA (US); Ramakrishna Manjunath, Bangalore (IN)

(73) Assignee: Juniper Networks, Inc, Sunnyvale, CA (US)

( * ) Notice: Subject to any disclaimer, the term of this patent is extended or adjusted under 35 U.S.C. 154(b) by 48 days.

(21) Appl. No.: 16/351,255

(22) Filed: Mar. 12, 2019

(51) Int. Cl.
*H04L 12/805* (2013.01)
*H04L 12/26* (2006.01)
*H04L 12/751* (2013.01)
*H04L 12/46* (2006.01)

(52) U.S. Cl.
CPC ........ *H04L 47/365* (2013.01); *H04L 12/4633* (2013.01); *H04L 43/0888* (2013.01); *H04L 43/50* (2013.01); *H04L 45/026* (2013.01)

(58) Field of Classification Search
CPC .................................................... H04L 47/365
See application file for complete search history.

(56) References Cited

U.S. PATENT DOCUMENTS

| | | | |
|---|---|---|---|
| 7,215,667 B1* | 5/2007 | Davis | H04L 12/4633 370/389 |
| 8,514,894 B2* | 8/2013 | Davis | H04L 63/0485 370/505 |
| 9,985,794 B2* | 5/2018 | Pani | H04L 41/082 |
| 2004/0158710 A1* | 8/2004 | Buer | H04L 63/164 713/160 |
| 2006/0126509 A1* | 6/2006 | Abi-Nassif | H04L 47/263 370/235 |
| 2009/0003383 A1* | 1/2009 | Watanabe | H04W 28/06 370/474 |

(Continued)

OTHER PUBLICATIONS

Wikipedia, "Tunneling protocol", URL: https://en.wikipedia.org/wiki/Tunneling_protocol, May 13, 2005, 4 pages.

(Continued)

*Primary Examiner* — Raj Jain
*Assistant Examiner* — Andrew C Lee
(74) *Attorney, Agent, or Firm* — FisherBroyles, LLP (57) ABSTRACT

A disclosed method may include (1) generating a test packet that includes an inner packet encapsulated within an outer packet, (2) adding, to the test packet, an amount of padding data that increases a total size of the test packet to a certain threshold, (3) forwarding, via a transport layer protocol, the test packet along a network path that leads from a source node to a destination node by way of a tunnel, (4) receiving the inner packet from the destination node after the destination node extracts the inner packet from the test packet, and (5) determining, based at least in part on receiving the inner packet from the destination node, that a maximum transmission unit of the network path is greater than or equal to the total size of the test packet as increased by the amount of padding data. Various other apparatuses, systems, and methods are also disclosed.

20 Claims, 7 Drawing Sheets

(56) References Cited

U.S. PATENT DOCUMENTS

| | | | | |
|---|---|---|---|---|
| 2010/0198980 A1* | 8/2010 | Astrom | ............... | H04L 47/38 709/231 |
| 2011/0103399 A1* | 5/2011 | Bransi | ............... | H04L 12/4633 370/470 |
| 2012/0304281 A1* | 11/2012 | Kang | ............... | G06F 21/44 726/16 |
| 2014/0122964 A1* | 5/2014 | Chen | ............... | H03M 13/05 714/758 |
| 2015/0003472 A1* | 1/2015 | Hwang | ............... | H04H 20/423 370/472 |
| 2015/0124629 A1* | 5/2015 | Pani | ............... | H04L 45/563 370/248 |
| 2015/0189659 A1* | 7/2015 | Mussot | ............... | H04L 43/0894 370/329 |
| 2015/0333993 A1* | 11/2015 | Welin | ............... | H04W 24/08 370/252 |
| 2018/0095981 A1* | 4/2018 | Jensen | ............... | G06F 16/1724 |
| 2018/0167294 A1* | 6/2018 | Gupta | ............... | H04L 43/106 |
| 2019/0044916 A1* | 2/2019 | Jones | ............... | H04L 63/0471 |
| 2019/0312820 A1* | 10/2019 | Yu | ............... | H04L 47/36 |

OTHER PUBLICATIONS

Parmenter et al., "Generic Routing Encapsulation (GRE)", URL: https://searchnetworking.techtarget.com/definition/Generic-Routing-Encapsulation-GRNPLE, Dec. 1, 2011, 5 pages.

MyShubhSang, "Layers and Protocols of OSI Model", URL: https://myshubhsang.wordpress.com/2016/09/26/tutorial-4-ccna-layers-of-osi-model/, Sep. 26, 2016, 5 pages.

Fairhurst et al., "Packetization Layer Path MTU Discovery for Datagram Transports", URL: https://tools.ietf.org/html/draft-ietf-tsvwg-datagram-plpmtud-05#section-5.2.2, Dec. 15, 2018, 20 pages.

* cited by examiner

APPARATUS, SYSTEM, AND METHOD FOR DISCOVERING PATH MAXIMUM TRANSMISSION UNITS

BACKGROUND

Network devices may include various interfaces that have different Maximum Transmission Units (MTUs). In this context, the MTU may represent and/or refer to the size of the largest packet capable of being transmitted via a certain interface. In some network paths, interfaces of one or more devices along the path may have different MTUs. For example, a source device at the beginning of a network path may have an MTU of 2000 bytes, while an intermediary device in the middle of the network path may have an MTU of 1400 bytes. Accordingly, the intermediary device may need to fragment packets of over 1400 bytes into segments of 1400 bytes or less before being able to forward the packets to the next downstream device in the path. When each fragmented segment of a packet reaches the destination device of the network path, the destination device may reassemble the segments to produce the original packet.

Unfortunately, the process of fragmenting and reassembling packets may be costly and/or time-intensive. For example, transmitting multiple packet segments may be less efficient than transmitting a single, larger packet. Moreover, some packets may be formatted or configured to prohibit and/or prevent fragmentation. For example, some packets may contain a flag or other notification that indicates, to devices within a network path, that the packets are to be dropped instead of fragmented upon reaching a device with an MTU smaller than the size of the packets. As a result, these packets may be unable to reach their intended destinations.

To avoid both fragmented and dropped packets, network devices and/or network administrators may implement a variety of techniques to determine a path MTU (PMTU) of a network path. Packets sized to comply with or correspond to this value may be transmitted along the path without being dropped or fragmented. However, traditional methods for PMTU discovery may be unable to determine the PMTU of certain types of network paths. For example, a conventional PMTU discovery system may determine the PMTU of a network path by forwarding test packets along the network path and receiving error messages in return (e.g., Internet Control Message Protocol (ICMP) error messages). Network paths that are protected by firewalls or other types of packet filters may block or drop the test packets and/or the returned error packets. In addition, some PMTU discovery systems may not be capable of forwarding packets across network interfaces (e.g., via tunnels). As a result, traditional PMTU discovery services may fail to identify PMTUs in various situations, thereby impeding the flow of traffic within or across networks.

The instant disclosure, therefore, identifies and addresses a need for additional and improved apparatuses, systems, and methods for discovering PMTUs.

SUMMARY

As will be described in greater detail below, the instant disclosure generally relates to apparatuses, systems, and methods for discovering PMTUs. In one example, a method for accomplishing such a task may include (1) generating a test packet that includes an inner packet encapsulated within an outer packet, (2) adding, to the test packet, an amount of padding data that increases a total size of the test packet to a certain threshold, (3) forwarding, via a transport layer protocol, the test packet along a network path that leads from a source node to a destination node by way of a tunnel, (4) receiving the inner packet from the destination node after the destination node extracts the inner packet from the test packet, and then (5) determining, based at least in part on receiving the inner packet from the destination node, that a PMTU of the network path is greater than or equal to the total size of the test packet as increased by the amount of padding data.

Similarly, a system that implements the above-identified method may include a physical processor configured to execute various modules stored in memory. In one example, this system may include (1) a generation module that generates a test packet that includes an inner packet encapsulated within an outer packet, (2) an adding module that adds, to the test packet, an amount of padding data that increases a total size of the test packet to a certain threshold, (3) a forwarding module that forwards, via a transport layer protocol, the test packet along a network path that leads from a source node to a destination node by way of a tunnel, (4) a reception module that receives the inner packet from the destination node after the destination node extracts the inner packet from the test packet, and (5) a determination module that determines, based at least in part on receiving the inner packet from the destination node, that a PMTU of the network path is greater than or equal to the total size of the test packet as increased by the amount of padding data.

Additionally or alternatively, an apparatus that implements the above-identified method may include a network interface that forwards packets in accordance with PMTUs. The apparatus may also include a processing device that is communicatively coupled to the network interface. In one example, the processing device may (1) generate a test packet that includes an inner packet encapsulated within an outer packet, (2) add, to the test packet, an amount of padding data that increases a total size of the test packet to a certain threshold, (3) forward, via a transport layer protocol, the test packet along a network path that leads from a source node to a destination node by way of a tunnel, (4) receive the inner packet from the destination node after the destination node extracts the inner packet from the test packet, and then (5) determine, based at least in part on receiving the inner packet from the destination node, that a PMTU of the network path is greater than or equal to the total size of the test packet as increased by the amount of padding data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for discovering PMTUs. As will be explained in greater detail below, embodiments of the instant disclosure may enable a network node to determine the PMTU of a network path that includes a network tunnel. For example, a source node of a network path may generate an encapsulated packet that is formatted to traverse a network tunnel to reach a destination node. The source node may test or evaluate the PMTU of the network tunnel by adding a certain amount of padding data (e.g., a buffer) to the encapsulated packet. After adding the padding data to the encapsulated packet, the source node may forward the encapsulated packet to the destination node via a transport layer (e.g., packetization layer) protocol. If the encapsulated packet reaches the destination node, the destination node may decapsulate the packet and return the decapsulated packet to the source node as an indication that the PMTU of the network tunnel is no greater than the size of the encapsulated packet (with the added padding data).

By forwarding the encapsulated packet via a transport layer protocol, embodiments of the instant disclosure may discover the PMTU of network paths that many traditional PMTU discovery systems (e.g., systems that probe network paths via network layer protocols) may be unable to probe. For example, firewalls or other network security measures may drop or block certain network packets (such as ICMP packets) sent via network layer protocols. Furthermore, by encapsulating test packets in accordance with tunneling mechanisms, embodiments of the instant disclosure may enable network nodes to discover the PMTUs of network tunnels. Accordingly, the disclosed embodiments may provide robust and/or efficient PMTU discovery systems in situations where traditional PMTU discovery systems have failed.

Figure 1:
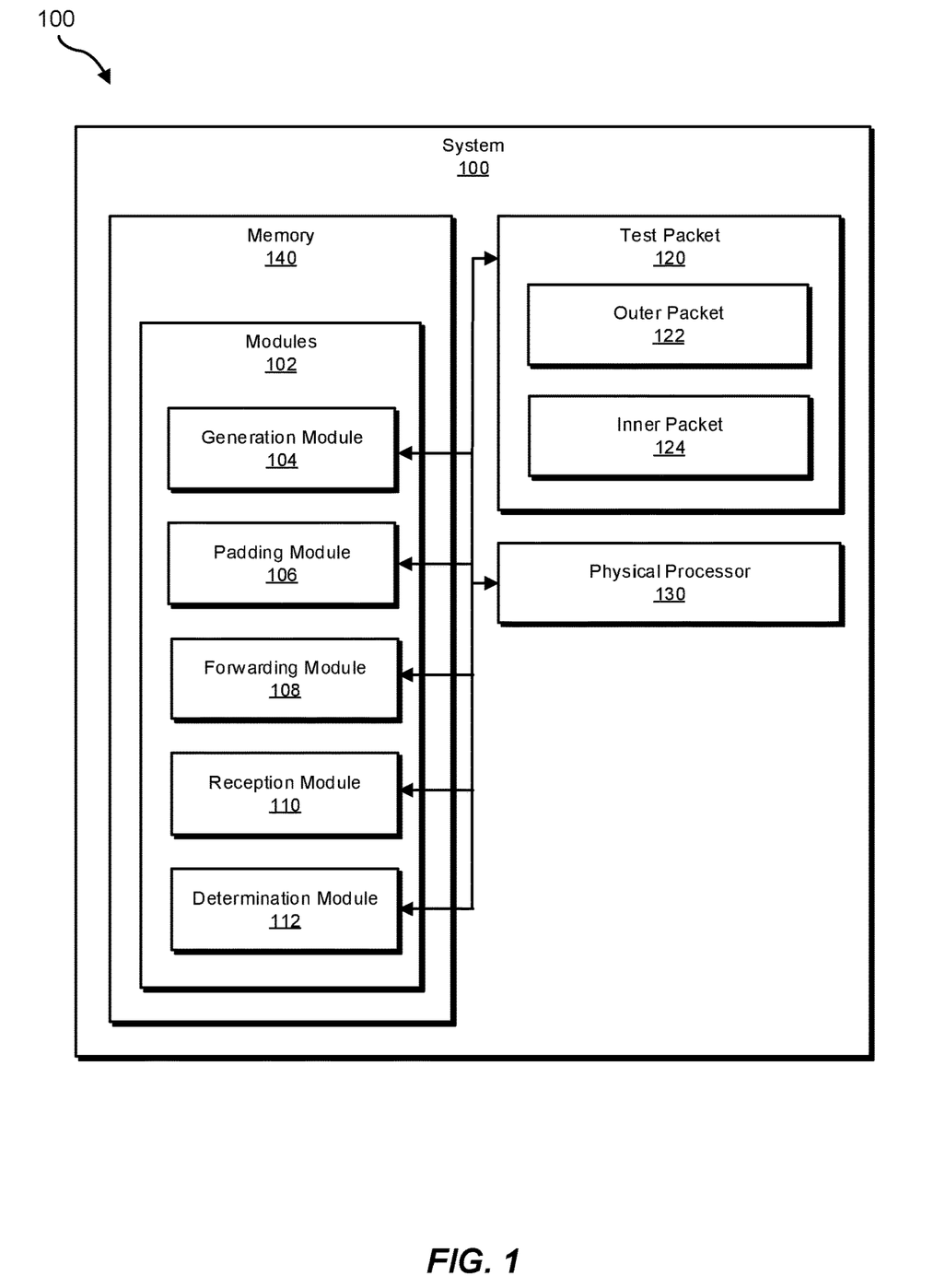
FIG. 1 is a block diagram of an exemplary system for discovering PMTUs.
Figure 2:
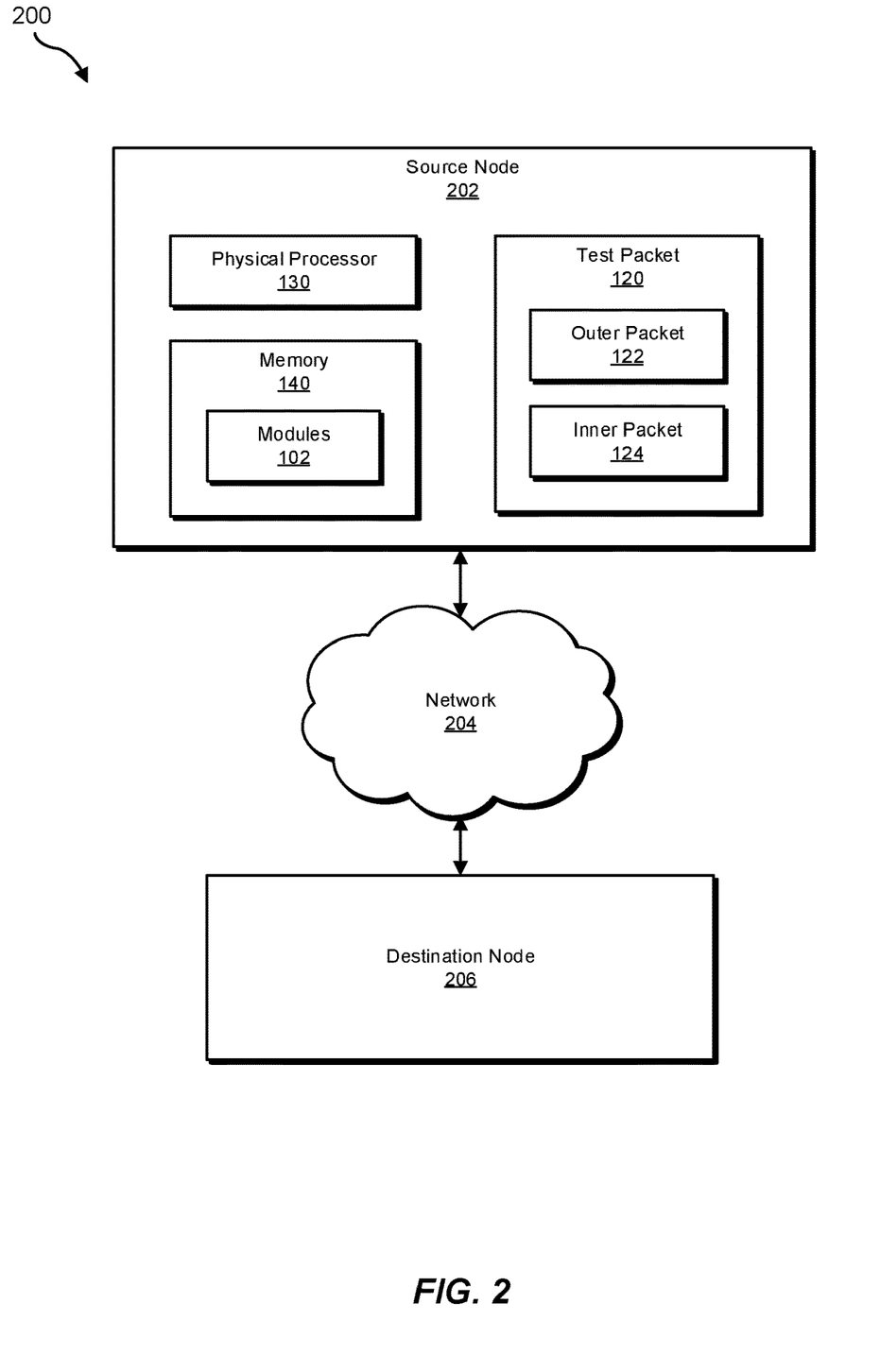
FIG. 2 is a block diagram of an additional exemplary system for discovering PMTUs.

The following will provide, with reference to FIGS. 1 and 2, detailed descriptions of exemplary apparatuses and systems for discovering PMTUs. Detailed descriptions of corresponding computer-implemented methods will be provided in connection with FIG. 3. Detailed descriptions of exemplary test packets that facilitate discovering PMTUs will be provided in connection with FIGS. 4 and 6. Detailed descriptions of exemplary network paths that lead between two nodes will be provided in connection with FIG. 5. In addition, detailed descriptions of an exemplary computing system for carrying out these methods will be provided in connection with FIG. 7.

FIG. 1 shows an exemplary system 100 that facilitates discovering PMTUs. As illustrated in FIG. 1, system 100 may include one or more modules 102 for performing one or more tasks. As will be explained in greater detail below, modules 102 may include a generation module 104, a padding module 106, a forwarding module 108, a reception module 110, and a determination module 112. Although illustrated as separate elements, one or more of modules 102 in FIG. 1 may represent portions of a single module or application (such as an operating system and/or an application for discovering PMTUs).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., source node 202 and/or destination node 206). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to discover PMTUs. Examples of physical processor 130 include, without limitation, CPUs, microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include one or more packets, such as a test packet 120. In some examples, test packet 120 may include and/or represent a network packet that facilitates discovering the PMTU of a network path. For example, a source node of the network path may initiate forwarding test packet 120 along the network path. In the event that the PMTU of the network path is greater than or equal to the size of test packet 120, test packet 120 may reach a destination node of the network path. In some examples, the destination node may indicate that test packet 120 was received by returning at least a portion of test packet 120 to the source node.

As illustrated in FIG. 1, test packet 120 may include an outer packet 122 and an inner packet 124. In one example, inner packet 124 may be encapsulated within outer packet 122. In this example, the destination node may indicate that test packet 120 was received by decapsulating inner packet 124 and returning inner packet 124 to the source node.

In some embodiments, test packet 120 may be formatted to traverse a network tunnel. For example, test packet 120 may be generated by encapsulating one Internet Protocol (IP) packet within another IP packet in accordance with a tunneling protocol (such as a Generic Routing Encapsulation (GRE) protocol, a Layer Two Tunneling Protocol (L2TP), an Internet Protocol Security (IPSEC) protocol, and/or a Secure Shell (SSH) protocol). In this way, test packet 120 may facilitate discovering the PMTUs of network paths that include tunnels. Additionally or alternatively, test packet 120 may be formatted to be forwarded via a transport layer protocol.

Exemplary system 100 in FIG. 1 may be implemented in a variety of ways. For example, all or a portion of exemplary system 100 may represent portions of exemplary system 200 in FIG. 2. As shown in FIG. 2, system 200 may include source node 202 in communication with a destination node 206 via a network 204. In one example, all or a portion of the functionality of modules 102 may be performed by source node 202, destination node 206, and/or any other suitable computing system. Various other computing devices (not necessarily illustrated in FIG. 2) may also represent part of and/or be included in system 200 and/or network 204.

In one example, source node 202 and/or destination node 206 may include instances of physical processor 130 and/or memory 140. In this example, the instances of physical processor 130 may be programmed to execute one or more of modules 102 stored within the instances of memory 140. Additionally or alternatively, source node 202 and/or destination node 206 may generate, forward, and/or receive test packet 120.

As will be described in greater detail below, one or more of modules 102 from FIG. 1 may, when executed by at least one processor of source node 202 and/or destination node 206, enable source node 202 and/or destination node 206 to discover the PMTU of a network path between source node 202 and destination node 206. For example, and as will be described in greater detail below, one or more of modules 102 may cause source node 202 to (1) generate test packet 120 that includes inner packet 124 encapsulated within outer packet 122, (2) add, to test packet 120, an amount of padding data that increases a total size of test packet 120 to a certain threshold, (3) forward, via a transport layer protocol, test packet 120 along a network path that leads from source node 202 to destination node 206 by way of a tunnel, (4) receive inner packet 124 from destination node 206 after destination node 206 extracts inner packet 124 from test packet 120, and then (5) determine, based at least in part on receiving inner packet 124 from destination node 206, that a PMTU of the network path is greater than or equal to the total size of test packet 120 as increased by the amount of padding data.

Source node 202 and destination node 206 generally represent any type or form of computing devices and/or software-based modules capable of reading computer-executable instructions and/or forwarding network traffic within a network and/or across networks. In one example, source node 202 and destination node 206 may represent any set of hardware- and/or software-based interfaces between which network packets may be transferred (e.g., via one or more additional devices or interfaces). In some embodiments, source node 202 and destination node 206 may represent network devices, such as routers, modems, hubs, repeaters, optical transceivers, bridges, switches, and/or gateways. Additional examples of source node 202 and destination node 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Network 204 generally represents any medium or architecture capable of facilitating communication or data transfer. Network 204 may facilitate communication or data transfer using wireless and/or wired connections. In one example, Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
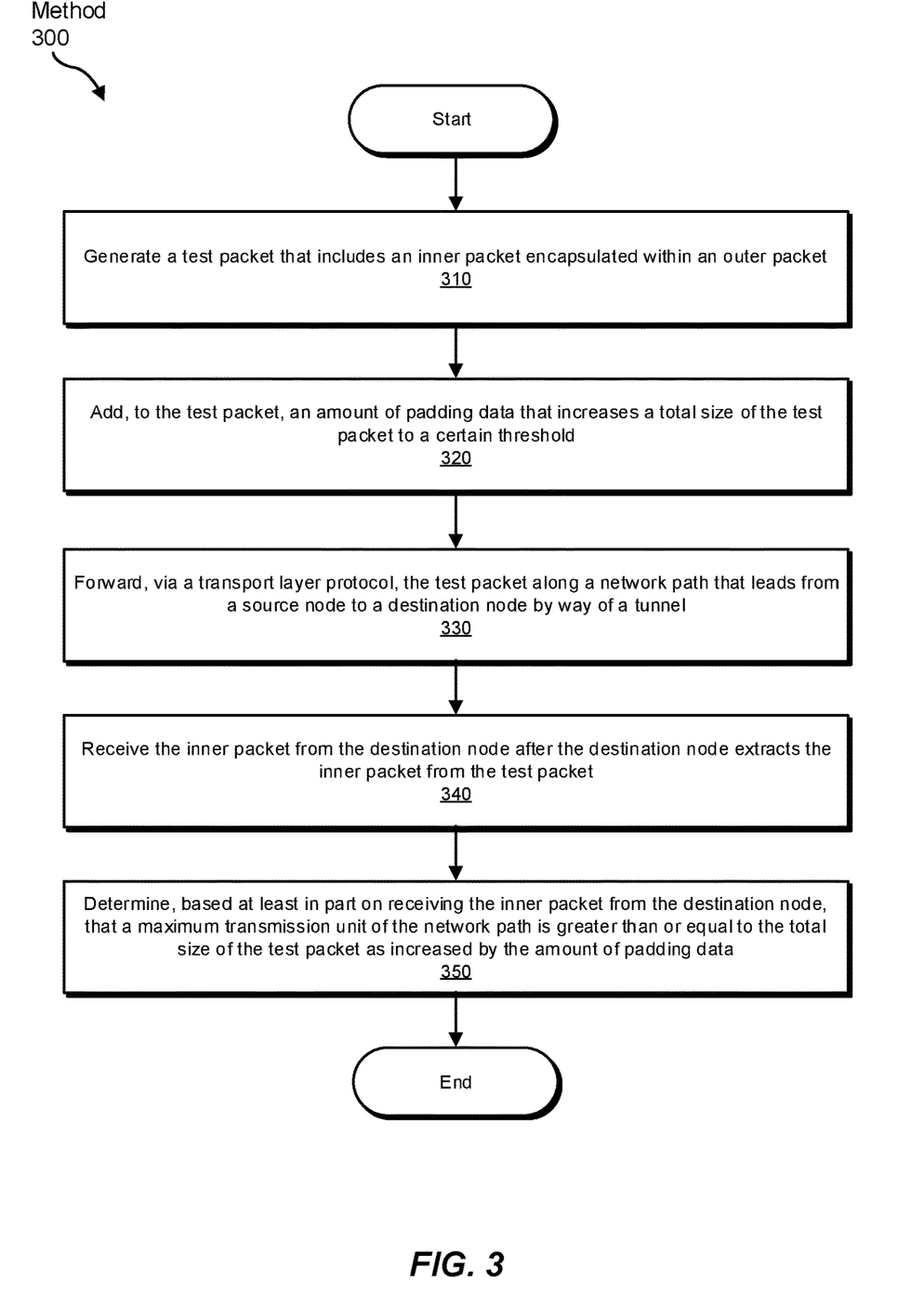
FIG. 3 is a flow diagram of an exemplary method for discovering PMTUs.

FIG. 3 is a flow diagram of an exemplary computer-implemented method 300 for discovering PMTUs of network paths. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may generate a test packet that includes an inner packet encapsulated within an outer packet. For example, generation module 104 may, as part of source node 202 in FIG. 2, generate test packet 120 that includes inner packet 124 encapsulated within outer packet 122. In this example, test packet 120 may be configured, constructed, and/or intended to facilitate discovering the PMTU of a network path that leads from source node 202 to destination node 206.

The systems described herein may perform step 310 in a variety of ways and/or contexts. In some examples, generation module 104 may generate test packet 120 in response to receiving or identifying a request to determine the PMTU of a network path that leads from source node 202 to destination node 206. For example, generation module 104 may determine that a user or computing device has requested to forward traffic along the network path. In response to this determination, generation module 104 may begin the process of discovering the PMTU of the network path in order to most efficiently transmit the traffic. Additionally or alternatively, generation module 104 may determine that a predetermined amount of time (e.g., two hours, one day, etc.) has lapsed since the PMTU of the network path was last determined. As such, generation module 104 may begin re-determining the PMTU of the network path to account for potential changes in the topology or configuration of the network path.

In some embodiments, generation module 104 may generate test packet 120 by encapsulating inner packet 124 within outer packet 122. As used herein, the term "encapsulation" generally refers to any type or form of process that logically covers or abstracts one packet with another packet. For example, encapsulating a packet may add a layer to the packet such that the resulting packet has an inner layer and an outer layer.

In some examples, the inner layer of such a packet may be obfuscated and/or hidden from network nodes that forward and/or receive the packet. For example, a network node may handle a packet in accordance with the headers, properties, and/or additional characteristics of the outer layer of the packet (while disregarding and/or not accessing data within the inner layer). As such, encapsulating a packet within another packet may enable the packet to appear to have one or more different properties, such as being forwarded via a different protocol and/or originating from a different source. In particular, encapsulating a packet within another packet may enable the encapsulated packet to be forwarded along a network tunnel. Accordingly, generation module 104 may encapsulate inner packet 124 within outer packet 122 in accordance with a tunneling protocol (such as a GRE protocol) to facilitate discovering the PMTU of a network tunnel.

The term "network tunnel," as used herein, generally refers to any type or form of network path or link that connects one network with another network. For example, the source node of a network tunnel may reside in one network (e.g., a local area network) and the destination node of the network tunnel may reside in another network (e.g., a wide area network). In some examples, a network tunnel may enable data to be transferred over a network that does not allow and/or is not configured to transfer the data. For example, a network tunnel may enable data originating in a private network to reach another private network by way of a public network.

Figure 4:
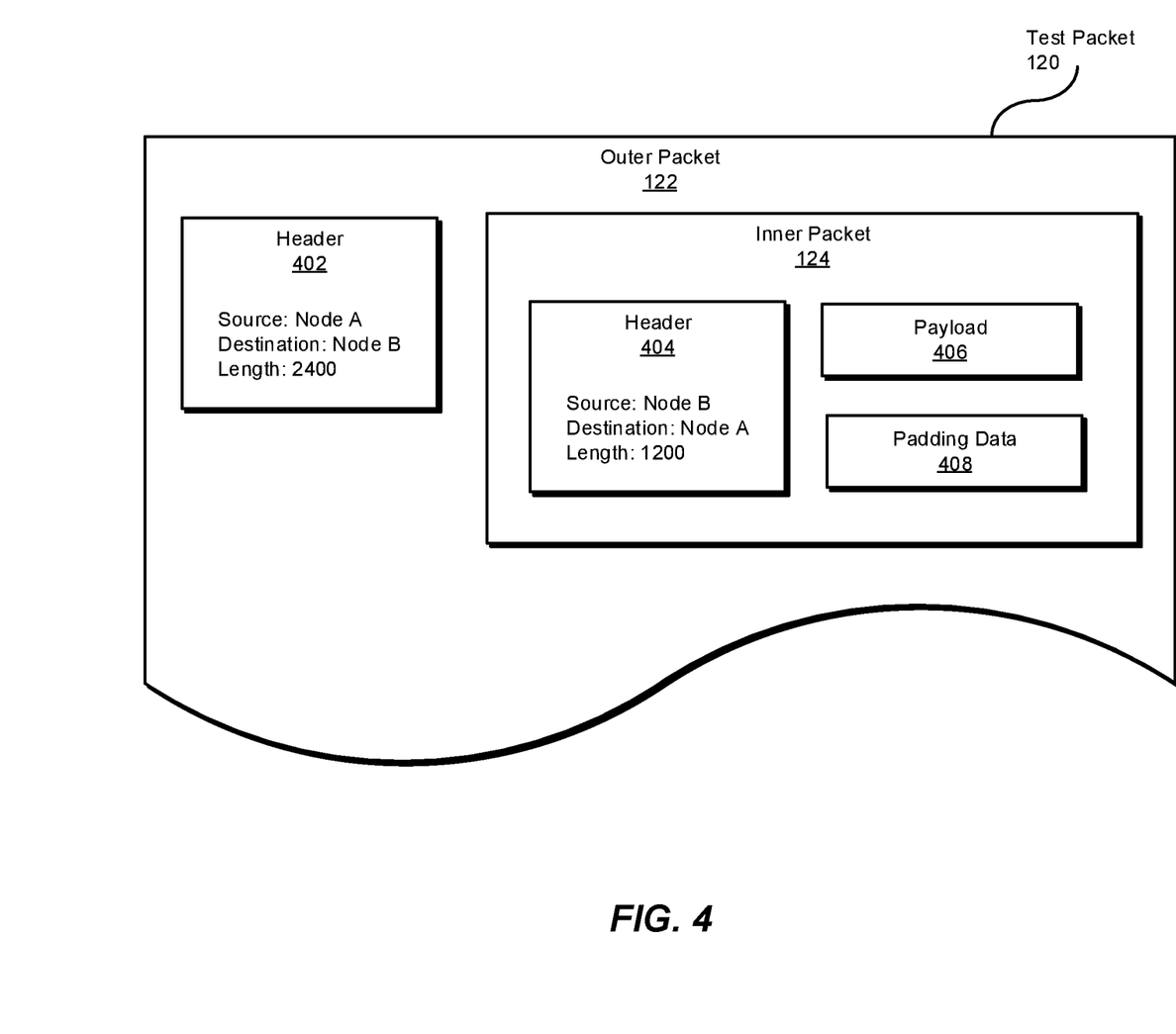
FIG. 4 is an illustration of an exemplary test packet that facilitates discovering PMTUs.

FIG. 4 illustrates an exemplary configuration of test packet 120 that shows inner packet 124 encapsulated within outer packet 122. In this example, outer packet 122 may include a header 402. Header 402 may indicate that the source of test packet 120 is "Node A" (e.g., source node 202) and that the destination of test packet 120 is "Node B" (e.g., destination node 206). As shown in FIG. 4, inner packet 124 may include a header 404 that indicates that the source of inner packet 124 is "Node B" and the destination of inner packet 124 is "Node A." In other words, header 404 may indicate that inner packet 124 is to be returned to source node 202 from destination node 206. As will be explained in greater detail below, destination node 206 may return inner packet 124 to source node 202 as an indication that test packet 120 was received at destination node 206. Outer packet 122 and/or inner packet 124 may include additional header and/or information not illustrated in FIG. 4.

In one embodiment, outer packet 122 and inner packet 124 may represent IP packets that have been encapsulated in accordance with a GRE protocol that produces GRE keepalive packets. For example, outer packet 122 may have at least a certain number of characteristics corresponding to a GRE keepalive request packet and inner packet 124 may have at least a certain number of characteristics corresponding to a GRE keepalive response packet. While the intended function of a GRE keepalive packet may be to ensure that a connection between two tunnel interfaces does not terminate, the systems disclosed herein may utilize GRE keepalive mechanisms to discover PMTUs of network paths. Test packet 120 may represent and/or include any additional or alternative type of packet that is capable of and/or configured to traverse a tunnel.

Returning to FIG. 3, at step 320 one or more of the systems described herein may add, to the test packet, an amount of padding data that increases a total size of the test packet to a certain threshold. For example, adding module 106 may, as part of source node 202 in FIG. 2, add an amount of padding data to test packet 120 that increases a total size of test packet 120 to a certain threshold. In this example, step 320 may be performed before, after, or concurrently with step 310.

The term "padding data," as used herein, generally refers to any data that increases the size of a packet without altering other properties of the packet (such as the destination of the packet and/or instructions within the payload of the packet). For example, padding data may represent extraneous and/or superfluous information that is appended to, inserted within, and/or otherwise added to a packet. In one example, padding data may represent and/or be composed of a buffer (such as an sk_buff data structure or an mbuf data structure). In another example, padding data may represent and/or be composed of randomly generated strings or sequences. Padding data may be added into any suitable portion of a packet, including a header and/or the payload of the packet.

The systems disclosed herein may perform step 320 in a variety of ways and/or contexts. In some examples, adding module 106 may select and/or determine the amount of padding data to add to test packet 120 based on a desired size of test packet 120. For example, adding module 106 may calculate an appropriate amount of padding data to add to test packet 120 by determining the difference between the current size of test packet 120 and the desired size of test packet 120.

In some examples, the desired size of test packet 120 may correspond to an expected and/or estimated value of the PMTU of the network path between source node 202 and destination node 206. For example, adding module 106 may determine that the PMTU is likely to be about 2000 bytes and therefore select the desired size of test packet 120 to be within a certain range of 2000 bytes (e.g., 1800-2200 bytes). Additionally or alternatively, adding module 106 may determine the desired size of test packet 120 based on previous test packets that were forwarded along the network path as part of the process of discovering the PMTU. For example, adding module 106 may decrease the desired size of test packet 120 compared to the size of a previous test packet in the event that the previous test packet did not successfully reach destination node 206. Alternatively, adding module 106 may increase the desired size of test packet 120 in the event that the previous test packet successfully reached destination node 206. Adding module 106 may select the desired size of test packet 120 based on any type or form of searching algorithm (such as a binary search algorithm or an incremental search algorithm) that may be implemented when discovering the PMTU of a network path.

Adding module 106 may insert the padding data into test packet 120 at any point before, after, or concurrently with encapsulating inner packet 124 within outer packet 122. In addition, adding module 106 may insert the padding data into any portion of test packet 120. For example, adding module 106 may insert all the padding data into outer packet 122, insert all the padding data into inner packet 124, or spread the padding data across both outer packet 122 and inner packet 124.

In the example of FIG. 4, adding module 106 may insert padding data 408 into inner packet 124. In this example, adding module 106 may determine that the desired size of test packet 120 is 2400 bytes. In addition, adding module 106 may determine that the initial size of test packet 120 (e.g., the combined sizes of header 402, header 404, a payload 406 of inner packet 124, and any other data stored within test packet 120) is 1300 bytes. Adding module 106 may therefore insert 1100 bytes of padding data into inner packet 124.

As shown in FIG. 4, the length field of header 402 within outer packet 122 may indicate and/or correspond to the total size (i.e., 2400 bytes) of test packet 120 after padding data 408 has been added to inner packet 124. However, the length field of header 404 within inner packet 124 may not correspond to the size of inner packet 124 after padding data 408 has been added to inner packet 124. As will be explained in greater detail below, this length may correspond to a desired size of inner packet 124 when inner packet 124 is returned to source node 202 by destination node 206. For example, this length may correspond to the size of inner packet 124 without padding data 408. Additionally or alternatively, this length may correspond to the size of the smallest type of packet that may generally be forwarded from destination node 206 to source node 202 (e.g., a GRE keepalive response packet).

Returning to FIG. 3, at step 330 the systems described herein may forward, via a transport layer protocol, test packet 120 along a network path that leads from a source node to a destination node by way of tunnel. For example, forwarding module 108 may forward, via a transport layer protocol, test packet 120 along a network path that leads from source node 202 to destination node 206 by way of a tunnel.

The systems described herein may perform step 330 in a variety of ways and/or contexts. In some examples, forwarding module 106 may forward test packet 120 to the first downstream node within the network path that leads from source node 202 to destination node 206. After receiving test packet 120, this downstream node may determine whether the size of test packet 120 complies with the MTU of the downstream node. In the event that the size of test packet 120 complies with the MTU (e.g., the size of test packet 120 is less than or equal to the MTU), the downstream node may forward test packet 120 to the next downstream node. In one embodiment, the downstream node may forward test packet 120 based on destination information within header 402. This forwarding process may continue until test packet 120 reaches destination node 206 or test packet 120 arrives at an intermediary node whose MTU is less than the size of test packet 120.

Figure 5:
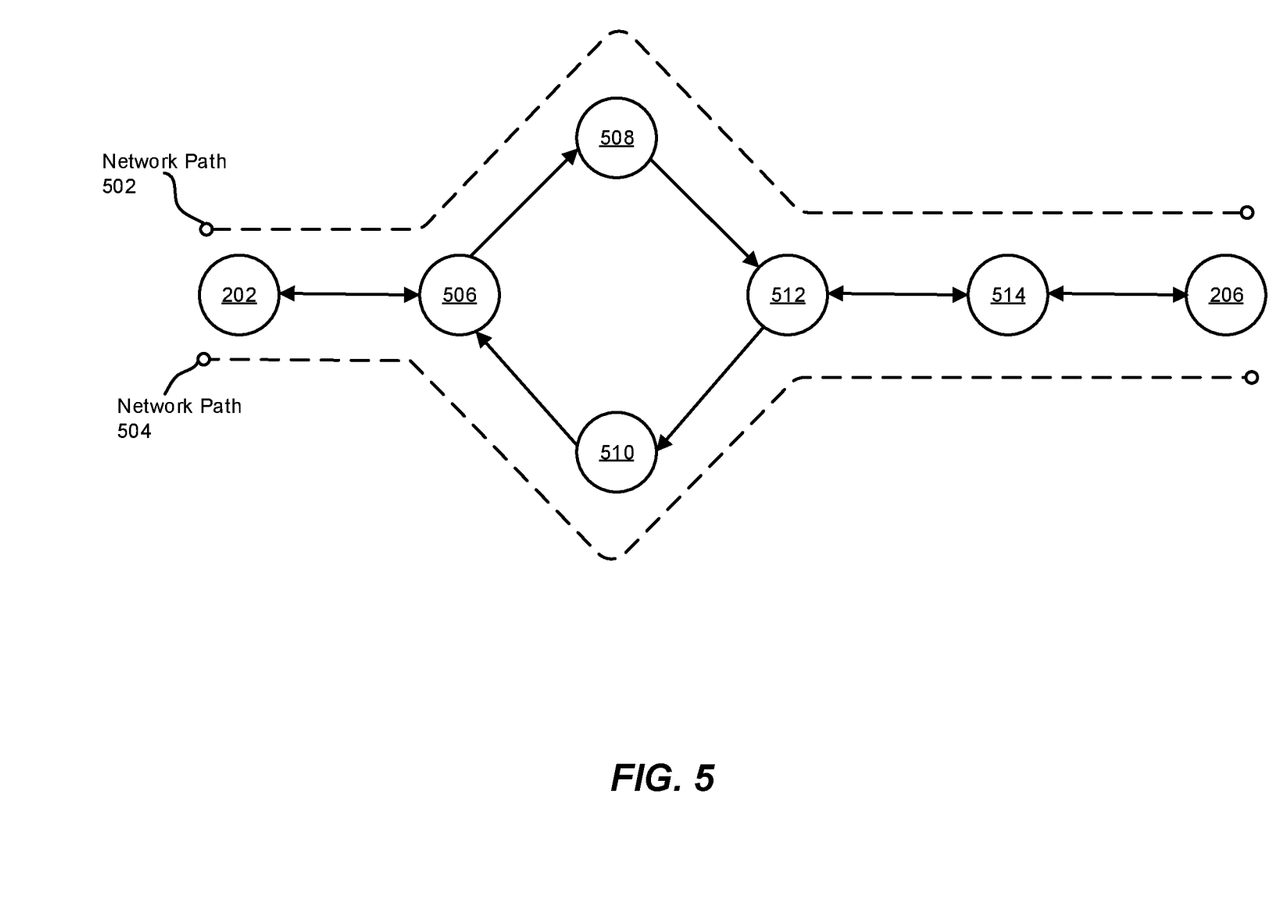
FIG. 5 is an illustration of exemplary network paths that lead between two nodes.

FIG. 5 illustrates an exemplary network path 502 that leads from source node 202 to destination node 206. As shown in FIG. 5, network path 502 may include source node 202, a node 506, a node 508, a node 512, a node 514, and destination node 206. In one embodiment, these nodes may collectively form a tunnel between source node 202 and destination node 206. For example, source node 202 may represent the ingress interface of the tunnel, and destination node 206 may represent the egress interface of the tunnel. In another embodiment, a portion of network path 502 may form a tunnel. For example, network path 502 may include a tunnel that begins at node 512 and ends at destination node 206.

In some embodiments, each node within the network path between source node 202 and destination node 206 may forward test packet 120 in accordance with a transport layer protocol. The term "transport layer," as used herein, generally refers to the portion and/or functionality of a network communication system that segments and/or divides data at a sending system (e.g., a source node) and reassembles the data at a receiving system (e.g., a destination node). The transport layer corresponds to Layer 4 within the Open Systems Interconnection (OSI) reference model. This layer may also be referred to as the packetization layer. The term "transport layer protocol," as used herein, generally refers to any type or form of network protocol that receives, forwards, or otherwise handles information transferred via the transport layer. Examples of transport layer protocols include, without limitation, Transmission Control Protocols (TCP) and User Datagram Protocols (UDP).

Many traditional PMTU discovery systems may discover PMTUs by forwarding and receiving packets via the network layer (i.e., Layer 3 within the OSI reference model). For example, a conventional PMTU discovery system may utilize error messages (such as ICMP packets) sent via network layer protocols. While these packets may provide information about the PMTU of a network path, these packets may be incompatible and/or ineffective in certain situations. For example, ICMP packets may be unable to facilitate determining the PMTU of a network path that includes firewalls or other packet filters that drop ICMP packets. Accordingly, by forwarding packets via transport layer protocols (or any other suitable protocols, such as Layer 5-7 protocols), the disclosed systems may provide more robust and/or efficient PMTU discovery services.

Returning to FIG. 3, at step 340 one or more of the systems described herein may receive the inner packet from the destination node after the destination node extracts the inner packet from the test packet. For example, reception module 110 may, as part of source node 202, receive inner packet 124 from destination node 206 after destination node 206 extracts inner packet 124 from test packet 120.

The systems described herein may perform step 340 in a variety of ways and/or contexts. In some examples, destination node 206 may be configured and/or directed to indicate, to source node 202, that destination node 206 received test packet 120. Destination node 206 may provide this indication in a variety of manners. In one embodiment, destination node 206 may provide this indication by returning inner packet 124 to source node 202. For example, after receiving test packet 120, destination node 206 may determine (e.g., based on information within header 402 of outer packet 122) that test packet 120 was forwarded to destination node 206 as part of a PMTU discovery process. Destination node 206 may then decapsulate test packet 120 such that inner packet 124 is available and/or separated from outer packet 122. Next, destination node 206 may forward all or a portion of inner packet 124 to source node 202.

In some embodiments, destination node 206 may alter one or more components of inner packet 124 before returning inner packet 124 to source node 202. For example, destination node 206 may remove all or a portion of the padding data added to inner packet 124 such that the size of inner packet 124 corresponds to the size indicated by a header of inner packet 124. In the example of FIG. 4, destination node 206 may remove all or a portion of padding data 408 from inner packet 124 such that the size of inner packet 124 is 1200 bytes (as indicated within the length field of header 404). In this example, destination node 206 may remove padding data 408 without altering or disrupting other data within inner packet 124 (such as payload 406).

Figure 6:
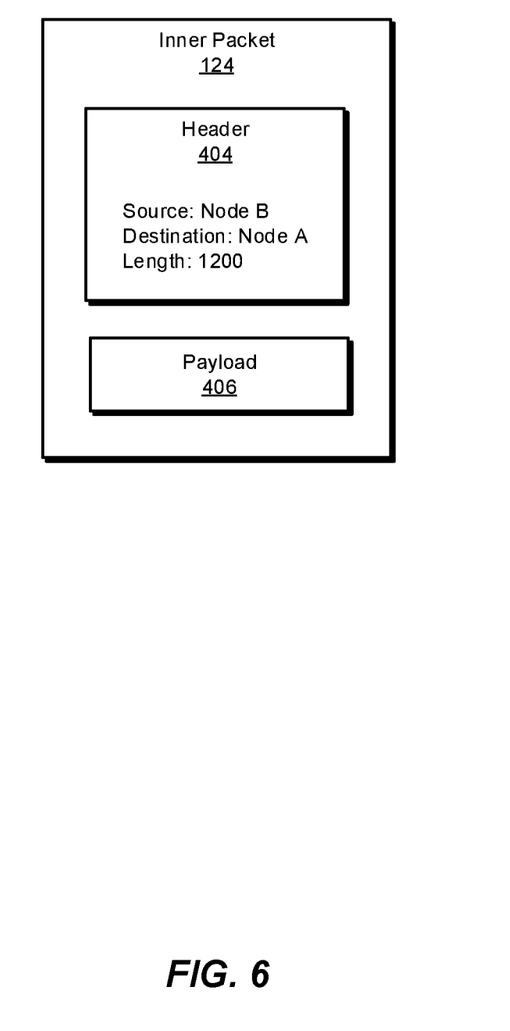
FIG. 6 is an illustration of an additional exemplary test packet that facilitates discovering PMTUs.

FIG. 6 illustrates an exemplary configuration of inner packet 124 after destination node 206 has extracted inner packet 124 from test packet 120 and removed padding data 408 from inner packet 124. As a result of removing padding data 408, the length field within header 404 may accurately describe the size of inner packet 124.

In some embodiments, removing padding data from inner packet 124 may be performed by a Layer 3 process within destination node 206 as inner packet 124 is processed to be forwarded from destination node 206. For example, the Layer 3 process may automatically trim or remove the data structure that contains the padding data to ensure that the size of inner packet 124 corresponds to the size indicated within header 404. The padding data may be removed from inner packet 124 in any additional or alternative manner, such as by another OSI layer process (e.g., a Layer 4 process) or an instance of one or more of modules 102 implemented within destination node 206.

By removing padding data from inner packet 124, destination node 206 may increase the likelihood that inner packet 124 is successfully forwarded to source node 202. For example, a network path that leads from destination node 206 to source node 202 may be different (e.g., asymmetric) than the network path that leads from source node 202 to destination node 206. In the event that this return network path has a smaller PMTU than the outgoing network path, inner packet 124 may be dropped while traversing the return path.

FIG. 5 illustrates an asymmetric network path 504 that leads from destination node 206 to source node 202. As shown in FIG. 5, network path 504 may include at least one node (e.g., a node 510) that is not included within network path 502. In the event that the MTU of node 510 is different than the MTU of node 508 within network path 502, removing unnecessary information (such as padding data) from inner packet 124 may ensure that inner packet 124 is not dropped due to noncompliance with the MTU of node 510. For example, as mentioned above, inner packet 124 (without added padding data) may represent a GRE keepalive response packet or similar packet whose size generally corresponds to the smallest packet that would typically be forwarded via a network tunnel. As such, this packet may be forwarded to destination node 206 without the threat of being dropped due to noncompliance with the PMTU of the return network path.

Additionally, generating outer packet 122 and inner packet 124 in accordance with a tunneling protocol may enable destination node 206 to return inner packet 124 to source node 202 even if destination node 206 is not configured to and/or capable of generating encapsulated packets to be forwarded via tunnels. For example, destination node 206 may simply decapsulate inner packet 124, remove padding data from inner packet 124 as appropriate, and forward inner packet 124 based on the header information populated by generation module 104 at source node 202.

In some examples, reception module 110 may monitor packets received at source node 202 for a predetermined amount of time (e.g., 30 seconds, 60 seconds, etc.) after test packet 120 is forwarded to destination node 206. This amount of time may be sufficient for test packet 120 to reach destination node 206, destination node 206 to extract inner packet 124 and remove padding data from inner packet 124, and then inner packet 124 to traverse the network path to source node 202. In the event that an inner packet that was encapsulated within a test packet is not received within this period of time, the disclosed systems may conclude that the test packet was unable to reach destination node 206. For example, the disclosed systems may determine that the size of the test packet did not comply with the MTU of at least one node between source node 202 and destination node 206 and was therefore dropped.

Returning to FIG. 3, at step 350 one or more of the systems described herein may determine, based at least in part on receiving the inner packet from the destination node, that an MTU of the network path is greater than or equal to the total size of the test packet as increased by the amount of padding data. For example, determination module 112 may, as part of source node 202 in FIG. 2, determine that the MTU of the network path is greater than or equal to the total size of test packet 120 based at least in part on receiving inner packet 124 from destination node 206.

The systems described herein may perform step 350 in a variety of ways and/or contexts. In some examples, receiving inner packet 124 from destination node 206 may indicate, to determination module 112, that test packet 120 was successfully forwarded along the network path from source node 202 to destination node 206. For example, determination module 112 may infer and/or conclude that the size of test packet 120 complied with the MTU of each network node between source node 202 and destination node 206. Determination module 112 may therefore determine that PMTU of the network path must be greater than or equal to the size of test packet 120.

The systems disclosed herein may perform a variety of actions after determining that the PMTU of the network path is greater than or equal the total size of test packet 120. In some examples, source node 202 may determine that the size of test packet 120 corresponds to (e.g., with sufficient accuracy) the PMTU of the network path. Source node 202 may therefore begin forwarding network traffic along the network path based on the size of test packet 120. For example, source node 202 may size any packets to be forwarded along the network path to be no larger than the size of test packet 120.

In other examples, the systems disclosed herein may forward one or more additional test packets along the network path. These test packets may further refine and/or improve the discovered PMTU value of the network path. For example, generation module 104 may generate a test packet whose total size is slightly greater (e.g., 100 bytes greater, 200 bytes greater, etc.) than the size of test packet 120. In some examples, this greater size may be achieved by adding a greater amount of padding data to the test packet (e.g., compared to the amount of padding data added to test packet 120). Forwarding module 108 may then forward this test packet along the network path to determine whether the PMTU of the network path is greater than or equal to the size of the test packet.

In some examples, the systems described herein may determine that an inner packet that was encapsulated within an additional test packet is not received at source node 202 within a certain amount of time after forwarding the test packet. As explained above, failure to receive this inner packet may indicate, to source node 202, that the size of the test packet is greater than the PMTU of the network path. In response to failing to receive the inner packet, source node 202 may terminate the process of discovering the PMTU of the network path. Alternatively, source node 202 may continue to probe the network path with one or more smaller test packets.

As mentioned above, the PMTU of the network path that leads from source node 202 to destination node 206 may be different than the PMTU of the return network path. Accordingly, the disclosed systems may probe the return network path to discover the PMTU of the return network path. This process may occur at any point before, during, or after probing the PMTU of the network path that leads from source node 202 to destination node 206. In addition, this process may be generally similar to the process of probing the network path that leads from source node 202 to destination node 206.

For example, destination node 206 may host and/or operate all or a portion of modules 102. To discover the PMTU of the return network path, these modules may (1) generate a test packet that includes an inner packet encapsulated within an outer packet, (2) add a certain amount of padding data to the test packet that increases the total size of the test packet to a certain threshold, (3) forward, via a transport layer protocol, the test packet along a network path that leads from destination node 206 to source node 202, (4) receive the inner packet from source node 202 after source node 202 extracts the inner packet from the test packet, and then (5) determine, based at least in part on receiving the inner packet from source node 202, that the PMTU of the network path that leads from destination node 206 to source node 202 is greater than or equal to the total size of the test packet.

After determining the PMTU of the network path that leads from destination node 206 to source node 202, source node 202 and/or destination node 206 may forward packets along the network path in accordance with the discovered PMTU. For example, source node 202 and/or destination node 206 may forward packets whose size is less than or equal to the size of the test packet.

Figure 7:
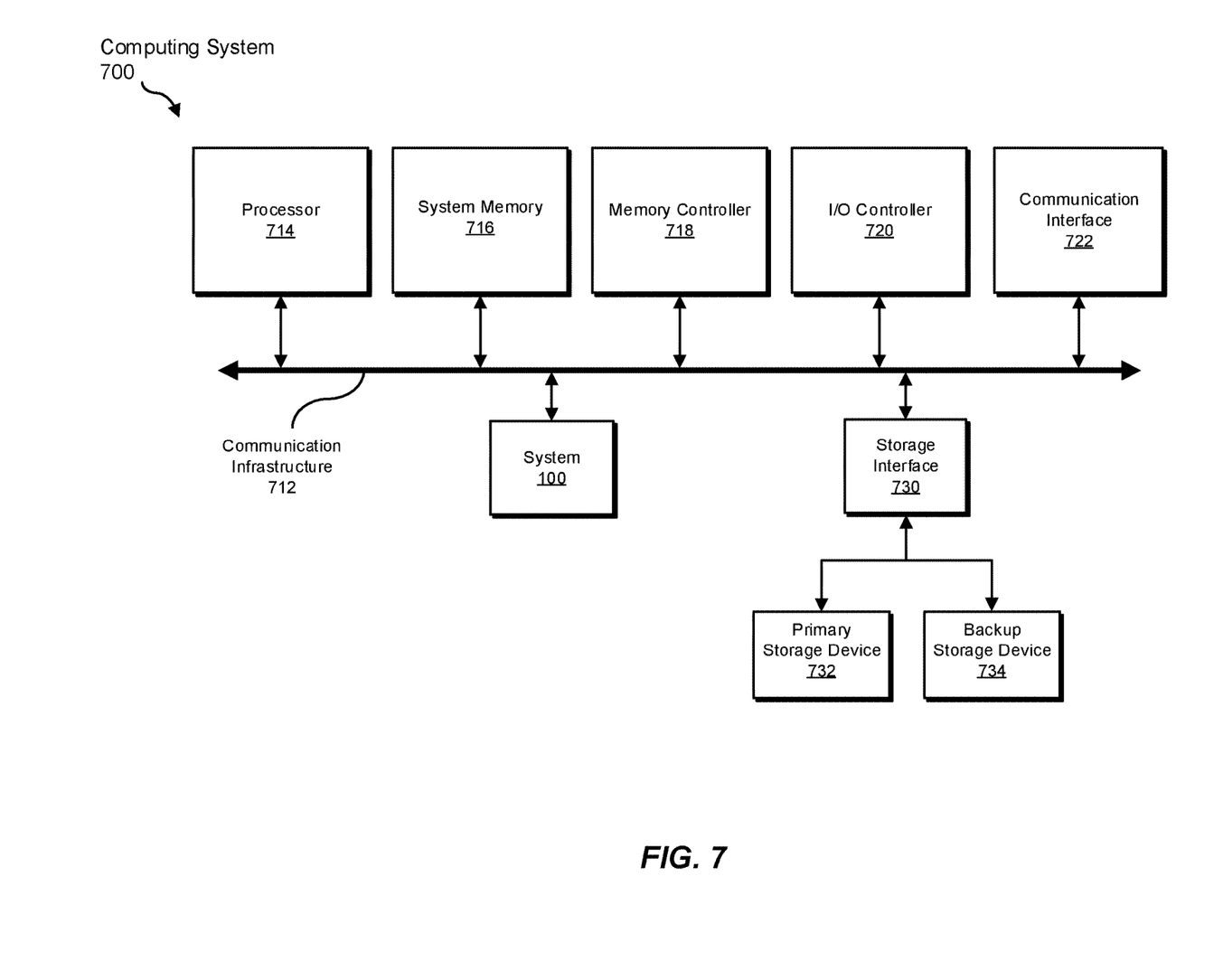
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the OSI reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
generating a test packet that includes an inner packet encapsulated within an outer packet;
identifying a desired size of the test packet that corresponds to an expected value of a maximum transmission unit of a network path that leads from a source node to a destination node by way of a tunnel;
selecting an amount of padding data to add to the test packet to achieve the desired size by calculating a difference between a current size of the test packet and the desired size of the test packet;
adding, to the test packet, the amount of padding data to increase a total size of the test packet to the desired size;
forwarding, via a transport layer protocol, the test packet along the network path that leads from the source node to the destination node by way of the tunnel;
receiving the inner packet from the destination node after the destination node extracts the inner packet from the test packet; and
determining, based at least in part on receiving the inner packet from the destination node, that the maximum transmission unit of the network path is greater than or equal to the total size of the test packet as increased by the amount of padding data.

2. The method of claim 1, wherein generating the test packet comprises encapsulating a Generic Routing Encapsulation (GRE) keepalive response packet within a GRE keepalive request packet.

3. The method of claim 1, wherein adding the padding data to the test packet comprises inserting, into the test packet, a buffer whose size corresponds to the amount of padding data.

4. The method of claim 1, wherein:
adding the padding data to the test packet comprises adding the padding data to the inner packet; and
generating the test packet comprises indicating, within a header of the inner packet, a desired inner packet size that is less than an actual size of the inner packet as increased by the amount of padding data.

5. The method of claim 4, wherein the desired inner packet size corresponds to a minimum transmission unit of packets forwarded via the transport layer protocol.

6. The method of claim 4, further comprising:
removing, by the destination node, at least a portion of the padding data from the inner packet such that the actual size of the inner packet corresponds to the desired size; and
forwarding, by the destination node, the inner packet to the source node after removing the portion of the padding data from the inner packet.

7. The method of claim 1, further comprising:
forwarding, along the network path, an additional test packet whose total size is greater than the total size of the test packet as increased by the amount of padding data;
detecting a failure to receive, from the destination node, an additional inner packet that was encapsulated within the additional test packet within a certain amount of time after forwarding the additional test packet; and
determining, based at least in part on the failure to receive the additional inner packet, that the maximum transmission unit of the network path is less than a total size of the additional test packet.

8. The method of claim 1, further comprising:
generating an additional test packet that includes an additional inner packet; and
forwarding the additional test packet along an additional network path that:
leads from the destination node to the source node; and
includes at least one network node that is not included within the network path that leads from the source node to the destination node.

9. The method of claim 8, further comprising:
receiving the additional inner packet from the source node after the source node extracts the additional inner packet from the additional test packet; and
determining, based at least in part on receiving the additional inner packet from the source node, that a maximum transmission unit of the additional network path is greater than or equal to a total size of the additional test packet.

10. A system comprising:
a generation module, stored in memory, that generates a test packet that includes an inner packet encapsulated within an outer packet;
a padding module, stored in memory, that:
identifies a desired size of the test packet that corresponds to an expected value of a maximum transmission unit of a network path that leads from a source node to a destination node by way of a tunnel;
selects an amount of padding data to add to the test packet to achieve the desired size by calculating a difference between a current size of the test packet and the desired size of the test packet;
adds, to the test packet, the amount of padding data to increase a total size of the test packet to the desired size;
a forwarding module, stored in memory, that forwards, via a transport layer protocol, the test packet along the network path that leads from the source node to the destination node by way of the tunnel;
a reception module, stored in memory, that receives the inner packet from the destination node after the destination node extracts the inner packet from the test packet;
a determination module, stored in memory, that determines, based at least in part on receiving the inner packet from the destination node, that the maximum transmission unit of the network path is greater than or equal to the total size of the test packet as increased by the amount of padding data; and at least one physical processor configured to execute the generation module, the padding module, the forwarding module, the reception module, and the determination module.

11. The system of claim 10, wherein the generation module generates the test packet by encapsulating a GRE keepalive response packet within a GRE keepalive request packet.

12. The system of claim 10, wherein the padding module adds the padding data to the test packet by inserting, into the test packet, a buffer whose size corresponds to the amount of padding data.

13. The system of claim 10, wherein:
the padding module adds the padding data to the inner packet; and
the generation module indicates, within a header of the inner packet, a desired inner packet size that is less than an actual size of the inner packet as increased by the amount of padding data.

14. The system of claim 13, wherein the desired inner packet size corresponds to a minimum transmission unit of packets forwarded via the transport layer protocol.

15. The system of claim 13, wherein the destination node:
removes at least a portion of the padding data from the inner packet such that the actual size of the inner packet corresponds to the desired size; and
forwards the inner packet to the source node after removing the portion of the padding data from the inner packet.

16. The system of claim 10, wherein:
the forwarding module forwards, along the network path, an additional test packet whose total size is greater than the total size of the test packet as increased by the amount of padding data;
the reception module detects a failure to receive, from the destination node, an additional inner packet that was encapsulated within the additional test packet within a certain amount of time after forwarding the additional test packet; and
the determination module determines, based at least in part on the failure to receive the additional inner packet, that the maximum transmission unit of the network path is less than a total size of the additional test packet.

17. The system of claim 10, wherein:
the generation module generates an additional test packet that includes an additional inner packet; and
the forwarding module forwards the additional test packet along an additional network path that:
leads from the destination node to the source node; and
includes at least one network node that is not included within the network path that leads from the source node to the destination node.

18. The system of claim 17, wherein:
the reception module receives the additional inner packet from the source node after the source node extracts the additional inner packet from the additional test packet; and
the determination module determines, based at least in part on receiving the additional inner packet from the source node, that a maximum transmission unit of the additional network path is greater than or equal to a total size of the additional test packet.

19. An apparatus comprising:
a network interface that forwards packets in accordance with path maximum transmission units; and
at least one processing device communicatively coupled to the network interface, wherein the processing device;
generates a test packet that includes an inner packet encapsulated within an outer packet;
identifies a desired size of the test packet that corresponds to an expected value of a maximum transmission unit of a network path that leads from a source node to a destination node by way of a tunnel;
selects an amount of padding data to add to the test packet to achieve the desired size by calculating a difference between a current size of the test packet and the desired size of the test packet;
adds, to the test packet, the amount of padding data to increase a total size of the test packet to the desired size;
forwards, via a transport layer protocol, the test packet along the network path that leads from the source node to the destination node by way of the tunnel;
receives the inner packet from the destination node after the destination node extracts the inner packet from the test packet; and
determines, based at least in part on receiving the inner packet from the destination node, that the maximum transmission unit of the network path is greater than or equal to the total size of the test packet as increased by the amount of padding data.

20. The apparatus of claim 19, wherein the processing device generates the test packet by encapsulating a GRE keepalive response packet within a GRE keepalive request packet.

* * * * *